United States Patent

Sharp et al.

Patent Number: 6,139,602
Date of Patent: Oct. 31, 2000

[54] CARBON CATALYZED LEACHING OF METAL-CONTAINING ORES

[75] Inventors: James E. Sharp; Kevin L. Stuffle; Sean P. Premeau, all of Tucson, Ariz.

[73] Assignee: Phillips Petroleum Company, Bartlesville, Okla.

[21] Appl. No.: 09/148,343

[22] Filed: Sep. 4, 1998

Related U.S. Application Data

[60] Provisional application No. 60/057,911, Sep. 4, 1997.

[51] Int. Cl.[7] .................................. C22B 3/06; C22B 3/08
[52] U.S. Cl. .......................... 75/711; 75/743; 423/150.1; 423/150.3
[58] Field of Search ............................... 75/711, 85, 743; 423/150.1, 150.3; 252/61, 62

[56] References Cited

U.S. PATENT DOCUMENTS

| | | | |
|---|---|---|---|
| 4,464,348 | 8/1984 | Burba, III | 423/150.4 |
| 4,511,540 | 4/1985 | Crussard et al. | 423/26 |
| 4,808,384 | 2/1989 | Vanderpool et al. | 423/21.1 |

FOREIGN PATENT DOCUMENTS

| | | |
|---|---|---|
| 2831146 | 1/1980 | Germany . |
| 57-076136 | 5/1982 | Japan . |
| 2086872 | 5/1982 | United Kingdom . |
| 9614438 | 5/1996 | WIPO . |
| 9629439 | 9/1996 | WIPO . |
| 9736013 | 10/1997 | WIPO . |

OTHER PUBLICATIONS

Taylor, P.R. and J.P. Vanderloop (1980) "An Investigation into the Leaching Kinetics of Cobaltite Ore with Ferric Sulfate Solutions" *Metallurgical transactions* 11B(1):83–88.

Kerfoot, Derek G.E. and D. Robert Weir (1988) "The Hydro And Electrometallurgy Of Nickel And Cobalt", Sherritt Gordon Mines Limited, Fort Saskatchewan, Alberta, Canada T8L 2P2, *Extractive Metallurgy of Nickel and Cobalt*, Edited by G.P. Tyroler and C.A. Landolt, The Metallurigcal Society, pp 241–267, No Month.

*Primary Examiner*—Jill Warden
*Assistant Examiner*—Tima McGuthry-Banks
*Attorney, Agent, or Firm*—Saliwanchik, Lloyd & Saliwanchik

[57] ABSTRACT

Disclosed and claimed is an efficient process for extraction of metals from ores using carbon catalyzed leaching. Specifically exemplified is the extraction of cobalt and nickel from laterite ore.

19 Claims, 2 Drawing Sheets

CARBON CATALYZED LEACHING OF METAL-CONTAINING ORES

CROSS-REFERENCE TO A RELATED APPLICATION

This application claims priority to U.S. Patent Application Serial No. 60/057,911, filed Sep. 4, 1997.

BACKGROUND OF THE INVENTION

Large deposits of laterite ores that contain high concentrations (>5%) of cobalt and nickel exist world wide in the equatorial regions. Laterite consists of iron and manganese oxides and hydrates (mostly goethite and manganese wad) that contain nickel and cobalt as minor impurities.

There are several commercial processes for refining laterite ores. The predominant processes involve pyrometallugical refining which includes drying, reductive roasting, smelting and/or matte smelting. These processes are energy intensive, expensive, and cause air pollution.

To overcome these problems, a hydrometallurgical process is desirable. One such process, sulfuric acid pressure leach has been developed that is in practice at only one plant in the world (Kerfoot, Derek G. E. and Robert Weir [1988] "The Hydro And Electrometallurgy of Nickel And Cobalt", Sherritt Gordon Mones Limited, Fort Saskatchewan, Alberta, Canada T8L 2P2, Extractive Metallurgy of Nickel and Cobalt, edited by G. P. Troler and C. A. Landolt, The Metallurgical Society, pp. 241–267). Pressure acid leach processing, like smelting, has several drawbacks that have kept it from being widely used. Two of the drawbacks for using acid leach processing are that it utilizes very aggressive leach solutions and requires expensive autoclaves. Also, the pregnant leach solutions from pressurized acid leaching contain high concentrations of iron and manganese which consume acid and interfere with metal recovery.

The process described here is a hydrometallurgical process that uses less aggressive leaching solutions, is performed at atmospheric pressure, and produces a purer leach solution which represents a significant advancement in the art of cobalt and nickel refining.

BRIEF SUMMARY OF THE INVENTION

The subject invention concerns a process for the extraction of metals from ores using an aqueous solution and a carbon catalyst. Specifically exemplified herein is a process for the extraction of cobalt and nickel from laterite ores using an aqueous solution of ferric subsulfate. In a specific embodiment exemplified herein, ferric subsulfate is generated biologically from a ferric generator, and combined with a carbon catalyst. In another embodiment sulfuric acid can be used instead of ferric subsulfate in the process of the subject invention. In a preferred embodiment the carbon catalyst can be calcine petroleum, carbon black charcoal, calcine, or coconut shell.

In a preferred process specifically exemplified herein, the ore is agitated at about 100° C. and at atmospheric pressure. The carbon catalyst greatly enhances both the extraction rate and degree of extraction of cobalt and nickel in the presence of ferric subsulfate or sulfuric acid allowing for essentially complete extraction in a reasonable retention time.

The invention overcomes the difficulties of the prior art, namely high strength corrosive leach solutions, air pollutants, exotic materials of construction, and high iron and manganese tailings waste products.

Another important characteristic of the ferric-cobalt-nickel reaction is that the soluble iron concentration is depleted to very low levels during the reaction resulting in a pregnant leach solution of low iron content. Advantageously, during the reaction, the pH remains steady or drops slightly. A further advantage of the process of the subject invention is that the reaction can be conducted at atmospheric pressure.

Although the invention is exemplified herein with reference to the extraction of cobalt and nickel from laterite ores, the invention process also can be used to extract other metals from ores containing the same. Of particular interest in this regard are oxide ores or carbonate.

DETAILED DISCLOSURE OF THE INVENTION

Figure 1:
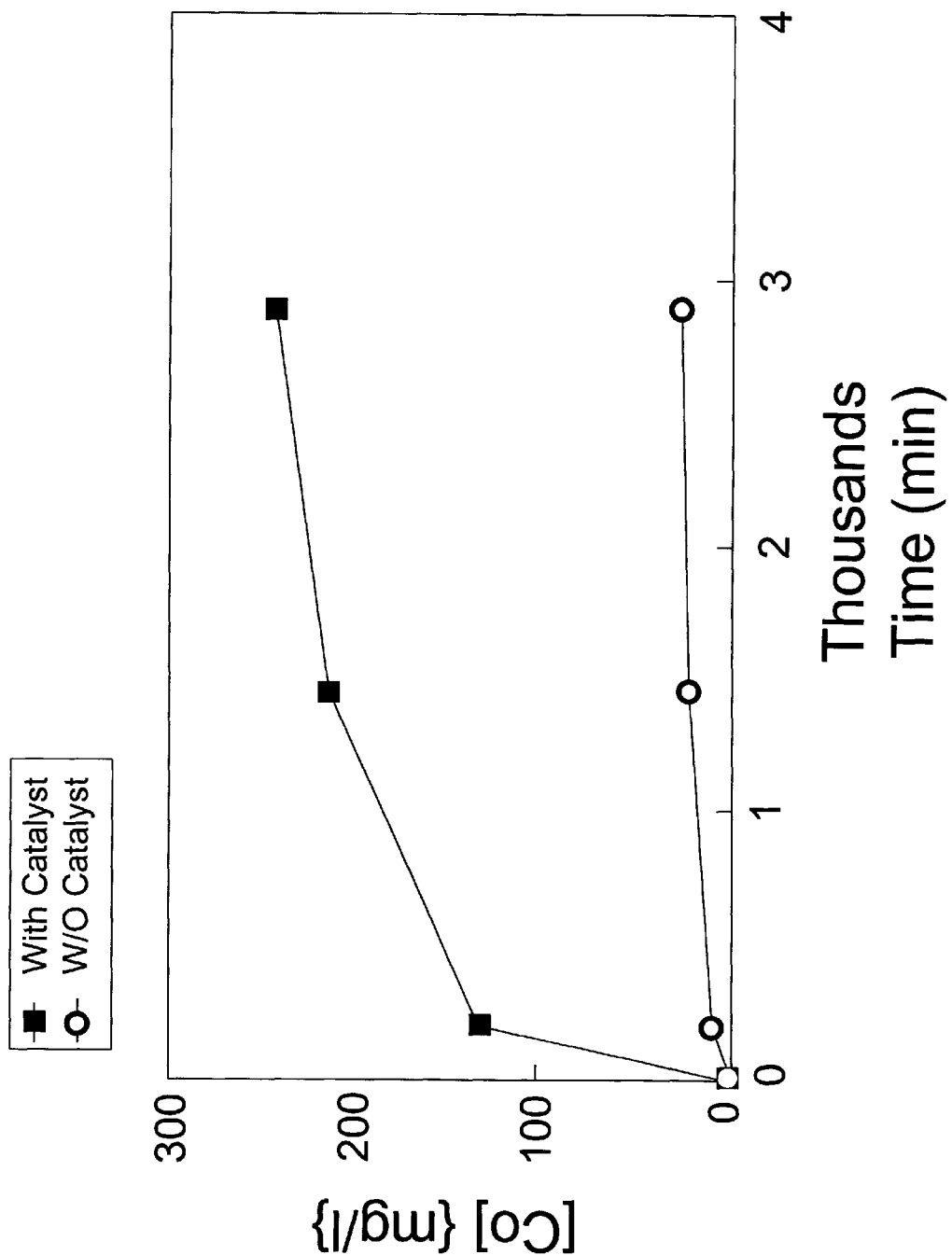
FIG. 1 shows the result of a ferric subsulfate leach of Co/Ni laterite ores.

The subject invention pertains to a process for the extraction of metals from ores. In a specific embodiment, the subject invention provides an efficient process for extracting cobalt and nickel from laterite ores using a carbon catalyst.

The carbon catalyst used according to the subject invention may be, for example, graphite, charcoal, calcine petroleum, carbon black charcoal, calcine, coconut shell, or the like. In a preferred embodiment, the catalyst is graphite.

The process can be conducted in a heated and agitated vessel with a reflux condenser. Preferably, the process is carried out between about 70° C. and 120° C. More preferably, the process is carried out between about 80° C. and 110° C. Most preferably the process is carried out at about 100° C.

In one embodiment the vessel is filled with a ferric subsulfate solution. Preferably, the ferric subsulfate solution is biologically generated. In a specific embodiment exemplified herein, the ferric subsulfate solution is produced by biological conversion of ferrous sulfate solution in the presence of pyrite and differs only in the degree of hydration from ferric sulfate. The solution is substoichiometric in sulfate ions and has a nominal composition of $Fe_4(SO_4)_5(OH)_2$.

In order to achieve maximum extraction efficiencies the ore solids are added in an amount not to exceed the stoichiometric ratio sufficient to achieve complete oxidation of cobalt through reduction of ferric. Reactions performed at less than stoichiometric conditions will achieve lower extractions. The carbon catalyst is added to the reaction vessel mixed with the ore solids. The reaction vessel is maintained at temperature and agitated until the cobalt and nickel are extracted.

In a further embodiment of the subject invention, sulfuric acid can be used instead of ferric subsulfate. In a preferred embodiment the sulfuric acid is used in a low concentration. This concentration may be, for example, about 0.3 M to about 1 M. Preferably, the sulfuric acid is at a concentration of 0.3 m to 0.5 M. Most preferably the sulfuric acid concentration is about 0.4 M.

Following are examples which illustrate procedures for practicing the invention. These examples should not be construed as limiting. All percentages are by weight and all solvent mixture proportions are by volume unless otherwise noted.

EXAMPLE 1

Leaching of Cobalt/Nickel Laterite Ores

Two batch leach experiments were performed on laterite ore with ferric subsulfate solution, with and without a carbon catalyst, to demonstrate the invention process. The reagents in the amounts listed in the tables below were used. The extractions were performed in two liter borosilicate Erlenmeyer flasks which were stirred with magnetic stir bars and heated on hotplates. Reflux condensers were placed on top of the flasks.

The ferric subsulfate solution was added to the flasks and heated to boiling, 100° C. The laterite ore and graphite were then added. The flasks were agitated and maintained at temperature for two days. The solutions were sampled periodically.

Cobalt, nickel and iron concentrations were determined by atomic adsorption. At the end of the leach period, the solid tails and carbon catalyst were recovered. Cobalt and nickel content of the tails was determined by aqua-rega digestion and atomic adsorption analysis.

TABLE 1

Hot ferric leach

| Time (min) | Fe (mg/l) | Ni (mg/l) | Ni (% Ext.) | Co (mg/l) | Co (% Ext.) | pH |
|---|---|---|---|---|---|---|
| 0 | 11420 | <1 | 0% | < | 0% | 2.01 |
| 210 | 2840 | 54.7 | 24.3% | 135 | 58.7% | 1.03 |
| 1440 | 970 | 106.3 | 47.2% | 220 | 95.7% | 1.04 |
| 2880 | 402 | 151.1 | 61.5% | 251 | 99.3% | 1.07 |
| X | — | 138.4 mg | — | 228.4 mg | — | — |

Description: 800 ml DW; 200 ml $Fe_2(SO_4)_3$ BRC 49 g Fe/l; 50 g laterite (.46% Co, .45% Ni); 0.5 ml $H_2SO_4$ 1:2.
Stir reactor temperature 100° C.
Liebig condenser 250 mm.
Ni available: 225.0 mg; PLS 950 ml.
Co available: 230.0 mg; TAILS: 62.15 g.
Ni extracted: 23.2 mg; % Ni extract: 10.3%.
Co extracted: 23.2 mg; % Co extract: 13.4%.

TABLE 2

Hot ferric leach

| Time (min) | Fe (mg/l) | Ni (mg/l) | Ni (% Ext.) | Co (mg/l) | Co (% Ext.) | pH |
|---|---|---|---|---|---|---|
| 0 | 11260 | <1 | 0% | <1 | 0% | 2.15 |
| 210 | 3890 | 6.5 | 2.9% | 9 | 3.9% | 1.06 |
| 1440 | 1950 | 15.4 | 6.8% | 25.3 | 11% | 0.94 |
| 2880 | 1128 | 24.3 | 10.3% | 32.3 | 13.4% | 0.91 |
| X | — | 23.2 mg | — | 30.9 mg | — | — |

Description: 800 ml Distilled Water; 200 ml $Fe_2(SO_4)_3$ BRC 49 g Fe/l; 50 g laterite (.46% Co; .45% Ni); 0.5 ml $H_2SO_4$ 1:2.
Liebig Condenser 250 mm
Ni Available: 225.0 mg; PLS: 910.0 ml.
Co Available: 230.0 mg; TAILS: 165.0 g.
Ni Extracted: 23.2 mg; % Ni Extract 10.3%.
Co Extracted: 30.9 mg; % Co Extract: 13.4%.

Figure 2:
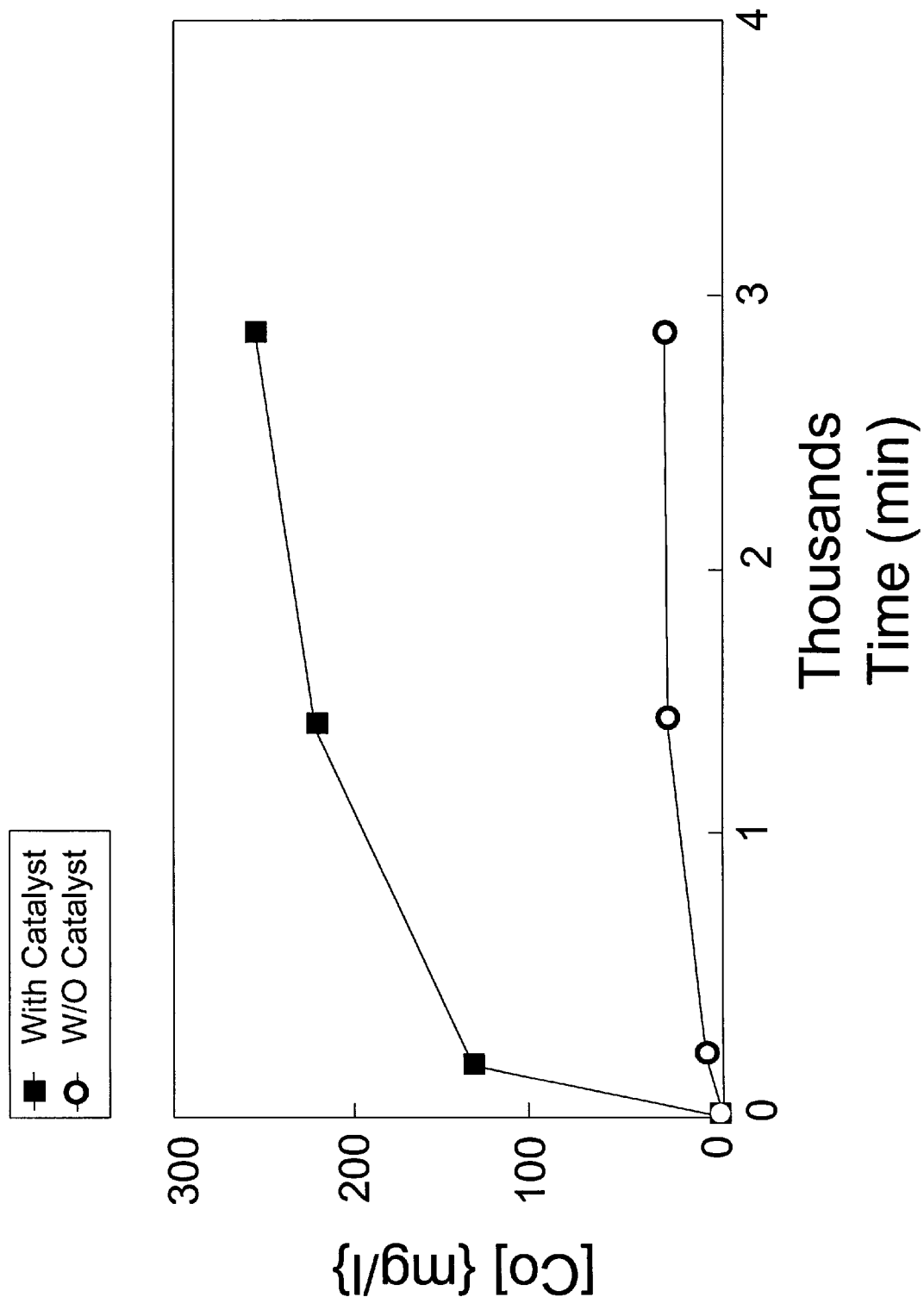
FIG. 2 shows the result of a ferric subsulfate leach of Co/Ni laterite ores.

The results of cobalt/nickel extractions with and without the carbon catalyst are shown in FIG. 1 and FIG. 2.

EXAMPLE 2

Use of Sulfuric Acid

Sulfuric acid, instead of ferric subsulfate can be used in the process as described in Example 1. In a preferred embodiment the concentration of sulfuric acid is about 0.4 m. When sulfuric acid is used, similar extraction efficiencies are achieved.

EXAMPLE 3

Leaching of Alternative Ores

Upon substituting an ore selected from the group consisting of oxide ore, carbonate ore, and silicate ore, for the laterite ore of Example 1, there is an extraction of any metal from said ore.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A process for extracting a metal from an ore which comprises:

(a) heating a ferric subsulfate solution in a vessel;

(b) adding to said vessel a carbon catalyst and an ore containing a metal; and (c) agitating said vessel until said metal is extracted.

2. The process, according to claim 1, wherein said ore is selected from the group consisting of oxide ores, carbonate ores, silicate ores, and laterite ores.

3. The process, according to claim 1, wherein said carbon catalyst is selected from the group consisting of graphite, calcine petroleum, carbon black charcoal, calcine, and coconut shell.

4. The process, according to claim 3, wherein said carbon catalyst is graphite.

5. The process, according to claim 1, wherein said metal is cobalt.

6. The process, according to claim 1, wherein said metal is nickel.

7. The process, according to claim 1, wherein said ferric subsulfate solution is heated to between about 70° C. and about 120° C.

8. The process, according to claim 7, wherein said ferric subsulfate solution is heated to about 100° C.

9. The process, according to claim 1, wherein cobalt is extracted from laterite ore.

10. The process, according to claim 1, wherein nickel is extracted from laterite ore.

11. A process for extracting a metal from an ore which comprises:

(a) heating a sulfuric acid solution in a vessel;

(b) adding to said vessel graphite and an ore containing a metal; and (c) agitating said vessel until said metal is extracted.

12. The process, according to claim 11, wherein said ore is selected from the group consisting of oxide ores, carbonate ores, silicate ores, and laterite ores.

13. The process, according to claim 11, wherein said carbon catalyst is selected from the group consisting of graphite, calcine petroleum, carbon black charcoal, calcine, and coconut shell.

14. The process, according to claim 11, wherein said metal is cobalt.

15. The process, according to claim 11, wherein said metal is nickel.

16. The process, according to claim 11, wherein said sulfuric acid solution is between about 0.3 M and about 1.0 M.

17. The process, according to claim 16, wherein said sulfuric acid solution is about 0.4M.

18. The process, according to claim 11, wherein cobalt is extracted from laterite ore.

19. The process, according to claim 11, wherein nickel is extracted from laterite ore.

* * * * *